(12) United States Patent
Zhao et al.

(10) Patent No.: US 10,511,978 B2
(45) Date of Patent: Dec. 17, 2019

(54) RESOURCE MANAGEMENT DEVICE, RESOURCE MANAGEMENT METHOD, AND DEVICE AND METHOD IN COMMUNICATION SYSTEM

(71) Applicant: SONY CORPORATION, Tokyo (JP)

(72) Inventors: Youping Zhao, Beijing (CN); Chen Sun, Beijing (CN); Jinxing Li, Beijing (CN); Xin Guo, Beijing (CN); Kangyi Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/161,340

(22) Filed: Oct. 16, 2018

(65) Prior Publication Data

US 2019/0053065 A1 Feb. 14, 2019

Related U.S. Application Data

(63) Continuation of application No. 15/533,501, filed as application No. PCT/CN2016/070690 on Jan. 12, 2013, now Pat. No. 10,136,332.

(30) Foreign Application Priority Data

Jan. 19, 2015 (CN) .......................... 2015 1 0025840

(51) Int. Cl.
*H04W 72/10* (2009.01)
*H04W 16/14* (2009.01)
(Continued)

(52) U.S. Cl.
CPC .......... *H04W 16/14* (2013.01); *H04W 16/10* (2013.01); *H04W 72/0433* (2013.01);
(Continued)

(58) Field of Classification Search
CPC . H04W 16/14; H04W 72/10; H04W 72/0453; H04W 72/0433; H04W 72/082; H04W 16/10; H04W 72/048
See application file for complete search history.

(56) References Cited

U.S. PATENT DOCUMENTS

2010/0062785 A1* 3/2010 Hwang ................ H04W 16/14
455/452.1
2011/0190029 A1 8/2011 Paerssinen et al.
(Continued)

FOREIGN PATENT DOCUMENTS

| CN | 102143603 A | 8/2011 |
| CN | 102186176 A | 9/2011 |
| CN | 104105141 A | 10/2014 |

OTHER PUBLICATIONS

International Search Report dated Apr. 13, 2016 in PCT/CN2016/070690 filed Jan. 12, 2016.

*Primary Examiner* — Chuong A Ngo
(74) *Attorney, Agent, or Firm* — Xsensus LLP

(57) ABSTRACT

A resource management device, a resource management method, and a device and method in a communication system. The resource management device is used for managing opportunistic utilization of frequency spectrum resources of a primary system by a secondary system in the communication system, and includes: a reception unit configured to receive device information and a resource request of a target secondary system device among one or more secondary system devices in the secondary system; an available resource acquisition unit configured to acquire, in response to the resource request, available resource information of the target secondary system device on the basis of the device information of the target secondary system device, wherein the resource information includes indication information related to transmission waveform used for the target secondary system device; and a notification unit configured to notify the target secondary system device of the acquired resource information.

5 Claims, 13 Drawing Sheets

(51) Int. Cl.
   *H04W 16/10*     (2009.01)
   *H04W 72/04*     (2009.01)
   *H04W 72/08*     (2009.01)

(52) U.S. Cl.
   CPC ..... *H04W 72/0453* (2013.01); *H04W 72/082* (2013.01); *H04W 72/10* (2013.01); *H04W 72/048* (2013.01)

(56) References Cited

U.S. PATENT DOCUMENTS

| | | | |
|---|---|---|---|
| 2011/0194423 A1* | 8/2011 | Cho | H04W 52/04 370/252 |
| 2015/0334599 A1 | 11/2015 | Maaref | |
| 2015/0382199 A1 | 12/2015 | Sun | |

* cited by examiner

RESOURCE MANAGEMENT DEVICE, RESOURCE MANAGEMENT METHOD, AND DEVICE AND METHOD IN COMMUNICATION SYSTEM

CROSS-REFERENCE TO RELATED APPLICATION(S)

This application is a continuation of U.S. application Ser. No. 15/533,501, filed Jun. 6, 2017, which is a National Stage Entry of International Patent Application No. PCT/CN2016/070690, filed Jan. 12, 2016, and claims priority to Chinese Patent Application No. 201510025840.8, filed Jan. 19, 2015, the entire contents of the above-identified applications are hereby incorporated by reference herein.

FIELD

The present disclosure generally relates to the field of wireless communication technology, and in particular to a resource management device and a resource management method for flexibly and efficiently managing opportunistic utilization for frequency spectrum resources of a primary system by a secondary system in a communication system, and a device and method on a side of a target secondary system apparatus in the secondary system.

BACKGROUND

With development of wireless communication technology, frequency spectrum resources become more and more limited, and the current research indicates that a utilization ratio of allocated licensed frequency spectrum resources is generally not high. Cognitive radio technology, as intelligent evolution of software radio technology, is a key technology to improve an actual utilization ratio of the frequency spectrums. The introduction of the cognitive radio technology can improve a problem of limited frequency spectrum resources. However, different modulation signals are transmitted in a same frequency band, thus a signal transmitted by a unlicensed cognitive radio apparatus unlicensed user or a secondary user) may interfere with a licensed user (a primary user) in a same frequency band, or a signal transmitted by a secondary user having a lower utilization priority for frequency spectrum resources may interfere with a secondary user having a higher utilization priority for the frequency spectrum resources in a same frequency band. Therefore, a frequency spectrum management device such as a cognitive engine and a frequency spectrum coordinator is required, which utilizes an advanced algorithm to manage transmission frequency spectrums of all secondary users, to avoid harmful interference on communication of the primary user or the high priority secondary user.

However, in the existing frequency spectrum resource management technology, frequency spectrum resource allocation for the target secondary user only includes rough frequency spectrum resource allocation regarding a frequency band in which the target secondary user operates, and fine frequency spectrum resource allocation such as a transmission waveform (including a multi-access mode, a modulation mode, specific time-domain resources (related information on each subcarrier, especially in a case of multi-carrier) and so on) to be used by the target secondary user is not mentioned.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problem, an object of the present disclosure is to provide a resource management device and a resource management method for managing opportunistic utilization for frequency spectrum resources of a primary system by a secondary system in a communication system, and a device and a method on a side of a target secondary system apparatus in the secondary system, which are capable of realizing dynamic fine frequency spectrum resource distribution for the target secondary system apparatus based on multiple factors such as an overall spectrum sensing result for an environment where the target secondary system apparatus as a cognitive radio apparatus is located, a state of the target secondary system apparatus and requirements for interference suppression of the primary system and the secondary system and so on, so as to more efficiently utilize the radio frequency spectrum resources and avoid generating harmful radio interference on other co-site users (for example, a primary user or a high priority secondary system apparatus), thereby realizing efficient frequency spectrum sharing between the target secondary system apparatus and the primary user or the high priority secondary system apparatus. In addition, at least one of following technical effects can be realized: complexity and cost of the cognitive radio apparatus are reduced, overhead of the frequency spectrum management in the communication system is decreased, adaptability and applicability of the cognitive radio apparatus in different electromagnetic environments are improved, and the frequency spectrum utilization ratio is also improved.

A resource management device in a communication system is provided according to an aspect of the present disclosure, the resource management device is configured to manage opportunistic utilization for frequency spectrum resources of a primary system by a secondary system in the communication system. The resource management device includes: a receiving unit configured to receive apparatus information and a resource request of a target secondary system apparatus among one or more secondary system apparatuses in the secondary system; an available resource acquiring unit configured to acquire, in response to the resource request, resource information available to the target secondary system apparatus based on the apparatus information of the target secondary system apparatus, where the resource information includes indication information related to a transmission waveform for the target secondary system apparatus; and a notifying unit configured to notify the target secondary system apparatus of the acquired resource information.

According to an embodiment of the present disclosure, the apparatus information may include a parameter related to a transmission waveform supported by the target secondary system apparatus.

According to another embodiment of the present disclosure, the apparatus information may include a parameter related to nonlinear characteristics of the target secondary system apparatus, and the available resource acquiring unit may be further configured to acquire the indication information related to the transmission waveform for the target secondary system apparatus based on the parameter related to the nonlinear characteristics of the target secondary system apparatus.

According to another embodiment of the present disclosure, the indication information related to the transmission waveform for the target secondary system apparatus may include a type of the transmission waveform.

According to another embodiment of the present disclosure, in a case that the type of the transmission waveform belongs to a multi-carrier type, the indication information related to the transmission waveform for the target secondary system apparatus further includes at least one of number of subcarrier frequency bands, a subcarrier sequence number and transmission power of a subcarrier.

According to another embodiment of the present disclosure, the type of the transmission waveform belonging to the multi-carrier type includes at least one of Orthogonal Frequency Division Multiplexing (OFDM) and Filter Bank based Multi-Carrier (FBMC).

According to another embodiment of the present disclosure, the indication information related to the transmission waveform for the target secondary system apparatus includes a parameter related to a filter to be adopted.

According to another embodiment of the present disclosure, the receiving unit is further configured to receive sensing information for a radio environment of the communication system from the target secondary system apparatus, and the available resource acquiring unit is further configured to acquire the resource information based on the sensing information.

According to another embodiment of the present disclosure, in a case that the type of the transmission waveform supported by the target secondary system apparatus belongs to a multi-carrier type, the sensing information includes information related to interference on a frequency corresponding to each of subcarriers.

According to another embodiment of the present disclosure, the sensing information may include information related to an occupation condition of sensed target frequency spectrum resources.

According to anther embodiment of the present disclosure, the sensing information may include information related to a type of a communication apparatus occupying sensed target frequency spectrum resources.

A device in a communication system is further provided according to another aspect of the present disclosure, the device being located on a side of a target secondary system apparatus among one or more secondary system apparatuses in a secondary system in the communication system. The device includes: a transmitting unit configured to transmit apparatus information and a resource request of the target secondary system apparatus to a resource management device, where the resource management device is configured to manage opportunistic utilization for frequency spectrum resources of a primary system by the secondary system in the communication system; a receiving unit configured to receive resource information available to the target secondary system apparatus, the resource information being acquired by the resource management device based on the apparatus information of the target secondary system apparatus in response to the resource request, where the resource information includes indication information related to a transmission waveform for the target secondary system apparatus; and a controlling unit configured to control, based on the received resource information, the target secondary system apparatus to operate.

A resource management method in a communication system is further provided according to another aspect of the present disclosure, the resource management method being used for managing opportunistic utilization for frequency spectrum resources in a primary system by a secondary system in the communication system. The resource management method includes: a receiving step of receiving apparatus information and a resource request of a target secondary system apparatus among one or more secondary system apparatuses in the secondary system; an available resource acquiring step of acquiring, in response to the resource request; resource information available to the target secondary system apparatus based on the apparatus information of the target secondary system apparatus, where the resource information includes indication information related to a transmission waveform for the target secondary system apparatus; and a notifying step of notifying the target secondary system apparatus of the acquired resource information.

A method in a communication system is further provided according to another aspect of the present disclosure, the method being performed on a side of a target secondary system apparatus among one or more secondary system apparatuses in a secondary system in the communication system, and the method includes: a transmitting step of transmitting apparatus information and a resource request of the target secondary system apparatus to a resource management device, where the resource management device is configured to manage opportunistic utilization for frequency spectrum resources of a primary system by the secondary system in the communication system; a receiving step of receiving resource information available to the target secondary system apparatus, the resource information being acquired by the resource management device based on the apparatus information of the target secondary system apparatus in response to the resource request, where the resource information includes indication information related to a transmission waveform for the target secondary system apparatus; and a controlling step of controlling, based on the received resource information, the target secondary system apparatus to operate.

An electronic apparatus is further provided according to another aspect of the present disclosure, the electronic apparatus including one or more processors configured to execute a function of each of units in the resource management device and the device on a side of the target secondary system apparatus according to the embodiments of the present disclosure described above, or execute processing in each of steps in the resource management method and the method performed on the side of the target secondary system apparatus according to the embodiments of the present disclosure described above.

A storage medium is further provided according to another aspect of the present disclosure, the storage medium including machine-readable program codes which, when executed on an information processing apparatus, enable the information processing apparatus to execute the resource management method and/or the method performed on the side of the target secondary system apparatus according to the embodiments of the present disclosure described above.

A program product is further provided according to another aspect of the present disclosure, the program product including machine-executable instructions which, when executed on an information processing apparatus, enable the information processing apparatus to execute the resource management method and/or the method performed on the side of the target secondary system apparatus according to the embodiments of the present disclosure described above.

According to the embodiments of the present disclosure, finer frequency spectrum resource allocation for the target secondary system apparatus as the cognitive radio apparatus can be realized so as to achieve more efficient frequency spectrum resource sharing, without generating harmful interference on a primary user in the primary system or a high priority secondary system apparatus.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1:
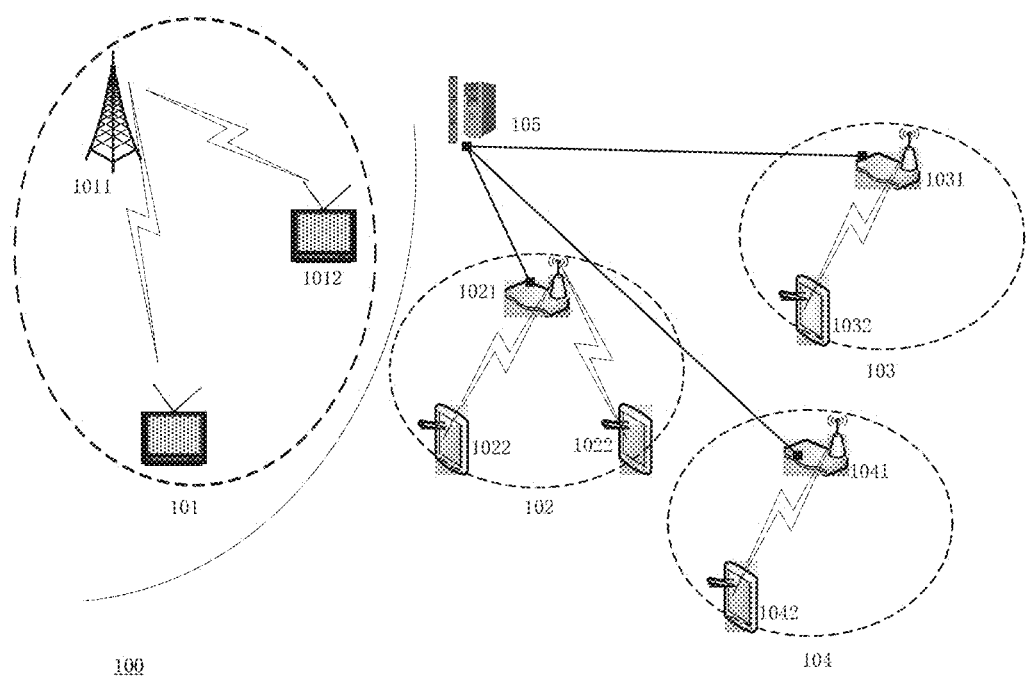
FIG. 1 is a schematic diagram showing an example of a communication system including a primary system and a secondary system.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Before specifically describing the embodiments of the present disclosure, brief introduction for some concepts in the present disclosure are given here to facilitate understanding of the present disclosure.

Primary System and Secondary System

The primary system refers to a system having a legal right to use frequency spectrum resources. There are a primary base station/a primary access point and one or more users (primary users) in the primary system. A secondary system, also referred to as a cognitive radio apparatus in some documents, can only opportunistically use the frequency spectrum without generating harmful interference on communication of the primary system with the frequency spectrum. The secondary system may include a secondary system apparatus including a secondary base station/a secondary access point and one or more users (secondary users). The secondary system may be a communication system having no right to use the frequency spectrum, for example, an LIE communication system which opportunistically utilizes wits/radar frequency band resources to perform communication, or a wifi communication system which opportunistically utilizes broadcast and television frequency band resources. Alternatively, the secondary system may also be a system having a right to use the frequency spectrum, but has a lower frequency spectrum utilization priority than the primary system. For example, in a case that a new base station is deployed by an operator to provide a new service, an existing base station and a service provided by the existing base station, as the primary system, have a high frequency spectrum utilization priority, and the new base station and the service provided by the new base station, as the secondary system, have a lower frequency spectrum utilization priority.

As an application example, an example of a communication system according to an embodiment of the present disclosure is described with reference to FIG. 1. FIG. 1 is a schematic diagram showing an example of a communication system including a primary system and a secondary system according to an embodiment of the present disclosure. As shown in FIG. 1, in the communication system 100, since the broadcast and television frequency spectrums are allocated to a broadcast and television system for use, the broadcast and television system is a primary system 101 including a primary base station 1011 and multiple primary users (televisions) 1012. Mobile communication systems 102, 103 and 104 are secondary systems including secondary base stations 1021, 1031 and 1041 and secondary users 1022, 1032 and 1042, respectively. In the communication system 100, for example, a frequency spectrum of a channel on which no program is played or a frequency spectrum of an adjacent channel in the digital broadcast and television frequency spectrums may be utilized dynamically to perform wireless mobile communication, without interfering with reception for a television signal.

Specifically, a UHF frequency band is allocated to the broadcast and television service, thus the broadcast and television system has the highest priority in the UHF frequency band and functions as the primary system. Further, frequency spectrum resources in the UHF which are not used by the broadcast and television system during a certain time period or in a certain region can be allocated to the other communication system for use, therefore, the other communication system functions as the secondary system.

It is required in such a communication mode in which the primary system coexists with the secondary system that an application of the secondary system will not adversely affect an application of the primary system or even a high priority secondary system. In other words, an influence caused by the frequency spectrum utilization of the secondary system can be controlled within an allowable range of the primary system, in particular, within an allowable range of the high priority secondary system. In a case that interference on the primary system and/or the high priority secondary system is within a certain range, that is, does not exceed an interference threshold, multiple secondary systems can use frequency spectrum resources for use by the primary system and/or the high priority secondary system.

It can be understood by those skilled in the art that, although FIG. 1 shows the primary system is the broadcast and television system, the present disclosure is not limited thereto. The primary system may be a mobile communication system having a right to use the frequency spectrum, and the secondary system may also be another system which utilizes the frequency spectrum resources to perform communication, for example, an intelligent metering system. In addition, the number of the secondary systems is not limited to be three, and there may be more or less secondary systems.

It should be noted that in an application scenario where the secondary systems include a higher priority secondary system and a lower priority secondary system, since the resources are preferentially allocated to the higher priority secondary system, the lower priority secondary system can opportunistically use resources which are not occupied by the higher priority secondary system. Therefore, the higher priority secondary system may be regarded as the primary system in the example.

Geographical Location Database (GLDB)

Currently, a main way of protecting the primary system is to store coverage information of the primary system in a database (for example, a geographical location database (GLDB) or a cognitive engine database). For example, an allowable interference limit of the primary system and a frequency spectrum resource usage condition of the primary system are also stored in the database. A secondary system in the same region accesses to the database and submits state information such as location information, a spectrum emission mask, a transmission bandwidth, a carrier frequency and so on of the secondary system, before using a frequency spectrum of the primacy system in the same region. The database then calculates an interference amount of the secondary system on the primary system based on the state information of the secondary system, and calculates an estimated available frequency spectrum resource for the secondary system in the current state based on the calculated interference amount of the secondary system on the primary system in the current state. The definition of the geographical location database and the method for determining the estimated available frequency spectrum resource by the geographical location database may be referred to a reference document "Draft of FCC report: Technical and operational requirements for the operation of white space devices under geo-location approach", CFPT, FCC 186, January, 2013 for example, detailed description thereof is omitted here.

Spectrum Coordinator

As described above, normal operation of the primary system is generally protected by the geographical location database in the cognitive radio, and the secondary system can directly access to the geographical location database to acquire available frequency spectrum resources. In further developed technology, a spectrum coordinator is further arranged on a side of the secondary system, and functions to manage/coordinate coexistence among the secondary systems (for example, in a case that multiple secondary systems close to each other desire to use the frequency spectrum resources of the primary system, the spectrum coordinator performs coordination), thereby improving communication quality and a spectrum utilization efficiency of the secondary systems. Specifically, the spectrum coordinator collects information on the secondary systems managed thereby and requests the database to calculate available resources, and adjusts and allocates, after acquiring the available resources, the resources to the secondary systems based on priorities or QoS requirements of the secondary systems for example.

It should be noted that the spectrum coordinator and the geographical location database can be arranged separately or integrally in the existing cognitive radio technology. The geographical location database mainly functions to calculate the available frequency spectrum resources which do not interfere with the primary system based on state information such as geographical locations of the secondary systems, while the spectrum coordinator mainly functions to manage/coordinate coexistence among the secondary systems (for example, in a case that multiple secondary systems close to each other desire to use the frequency spectrum resources of the primary system, the spectrum coordinator performs coordination). In the embodiments of the present disclosure, for convenience of description, the spectrum coordinator and the geographical location database are collectively referred to as a resource management device without distinction, and functions to be realized in the embodiments of the present disclosure can be implemented by the spectrum coordinator with the existing configuration of the geographical location database being unchanged, or be implemented by the geographical location database with the existing configuration of the spectrum coordinator being unchanged.

Figure 2:
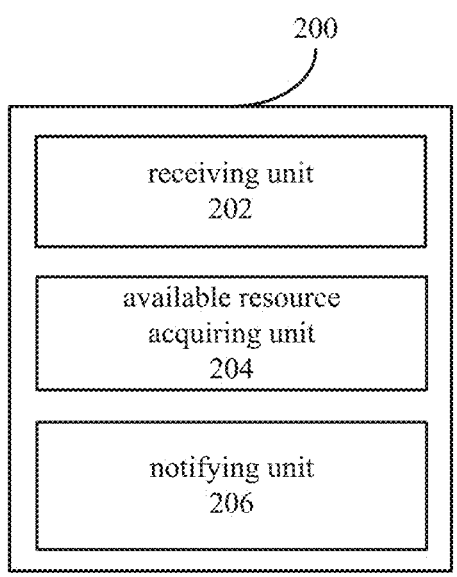
FIG. 2 is a block diagram showing a functional configuration example of a resource management device in a communication system according to an embodiment of the present disclosure.

Next, a functional configuration example of the resource management device in the communication system according to an embodiment of the present disclosure is described with reference to FIG. 2. FIG. 2 is a block diagram showing the functional configuration example of the resource management device in the communication system according to the embodiment of the present disclosure.

As shown in FIG. 2, a resource management device 200 according to the embodiment may include a receiving unit 202, an available resource acquiring unit 204 and a notifying unit 206. The resource management device 200 is configured to manage opportunistic utilization for frequency spectrum resources of a primary system by a secondary system in the communication system, that is, the secondary system can opportunistically and temporarily utilize frequency spectrum resources which are not used by the primary system for an application of the secondary system, without generating harmful interference on an application of the primary system. A functional configuration example of each of the units is described in detail next.

The receiving unit 202 may be configured to receive apparatus information and a resource request of a target secondary system apparatus among one or more secondary system apparatuses in the secondary system. Preferably, the secondary system apparatus may include a secondary system base station, a secondary system access point, a secondary system user terminal or other cognitive radio apparatus sharing spectrums. The apparatus information here may include state information such as location information, spectrum emission mask, a transmission bandwidth, a carrier frequency and so on of the target secondary system apparatus described above.

The available resource acquiring unit 204 may be configured to acquire, in response to the resource request, resource information available to the target secondary system apparatus based on the apparatus information of the target secondary system apparatus. The resource information may include indication information related to a transmission waveform for the target secondary system apparatus. In an example in which the resource management device 200 is implemented by the geographical location database, the geographical location database calculates, based on the apparatus information, a frequency band and a transmission waveform available to the target secondary system apparatus, which will not generate harmful interference on the primary system. In an example in which the resource management device 200 is implemented by the spectrum coordinator, the spectrum coordinator calculates, based on available resources, which will not generate harmful interference on the primary system, provided by the geographical location database, a transmission waveform and frequency spectrum resources available to a low priority secondary system apparatus, in a case that interference on for example a high priority secondary system is within a predetermined range.

Preferably, the indication information related to the transmission waveform for the target secondary system apparatus may include a type of the transmission waveform, for example, OFDM, FBMC, CDMA, GSM and the like. In addition, the indication information may further include at least one of a transmission spectrum and a transmission power corresponding to each type of transmission waveform. In addition, preferably, in a case that the type of transmission waveform belongs to a multi-carrier type, the indication information related to the transmission waveform for the target secondary system apparatus further includes at least one of number of subcarrier frequency bands, a subcarrier sequence number (for example, a starting subcarrier sequence number and an ending subcarrier sequence number of each frequency band) and a transmission power of a subcarrier. The multi-carrier type may include at least one of OFDM and FBMC. It should be understood that the type of the transmission waveform is selected based on factors such as a requirement for interference suppression of a target to be protected in addition to a transmission waveform supported by the target secondary system apparatus. For example, in an environment where suppression for adjacent channel interference is harsh, since FBMC technology has lower out-of-band spurious emission and higher spectrum utilization ratio as compared with an OFDM system, the FBMC technology is used preferentially.

Preferably, the indication information related to the transmission waveform for the target secondary system apparatus further includes a parameter related to a filter to be adopted, for example, a type (for example, a Kaiser window, a hamming window, a Blackman window or the like) of a window function of a shaping filter, a filter parameter (an order number, a coefficient or the like), a sampling rate and the like.

Examples of parameters included in the indication information related to the transmission waveform for the target secondary system apparatus are shown in Table 1 below. It should be understood that the parameters are only exemplary and not used for limitation, and the indication information may include one or more of the parameters, and may also include other parameters in addition to the parameters.

TABLE 1

| | Waveform parameter | | | | | |
|---|---|---|---|---|---|---|
| Type of waveform | The number of subcarrier frequency bands (1- Continuous frequency spectrums (2- 2 or more discontinuous frequency spectrums) | Starting subcarrier sequence number and ending subcarrier sequence number of each frequency band | (Sub carrier) maximum transmission power (dBm) | Type of window function of Shaping filter (1-Kaiser; 2- Hamming; 3-Blackman; 4- other) | Filter parameter (order number, coefficient) | Sampling rate |
| 1-OFDM | 1 | (1, 48) | −10 | 1 | $\{46; a_1, \ldots, a_{46}\}$ | 40 MSPS |
| 2-FBMC | 2 | (1, 16); (32, 64) | −2 | 2 | $\{16; a_1, \ldots, a_{16}\}$ | 20 MSPS |
| ... | ... | ... | ... | ... | ... | ... |

The notifying unit 206 may be configured to notify the target secondary system apparatus of the acquired resource information.

A process example of performing information interaction between the resource management device and the target secondary system apparatus to acquire the resource information available to the target secondary system apparatus according to the embodiment of the present disclosure is described in detail below with reference to FIG. 3A to FIG. 3C.

First Example

Figure 3A:
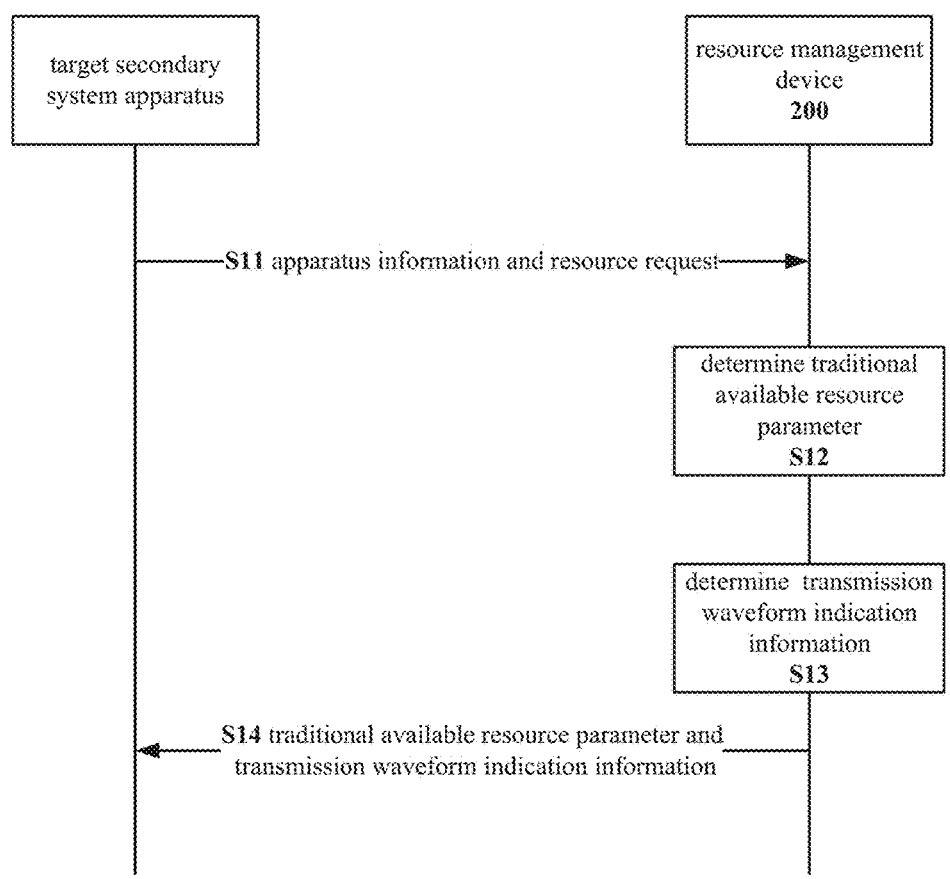
FIG. 3A is a schematic diagram showing a first example of an information interaction process between a resource management device and a target secondary system apparatus according to an embodiment of the present disclosure.

FIG. 3A is a schematic diagram showing a first example of an information interaction process between the resource management device and the target secondary system apparatus according to an embodiment of the present disclosure.

As shown in FIG. 3A, in S11, the target secondary system apparatus transmits the apparatus information and the resource request of the target secondary system apparatus to the resource management device 200.

Next, in S12, the available resource acquiring unit 204 of the resource management device 200 may firstly determine, in response to the resource request, traditional available resource parameters such as a frequency band, a maximum transmission power or the like available to the target secondary system apparatus based on a geographical location of the target secondary system apparatus in a traditional manner, while ensuring that no harmful interference on the primary system is generated. It should be understood that, in a case that the geographical location database and the spectrum coordinator are arranged separately, the available resource parameters may be determined by the geographical location database based on the geographical location of the target secondary system apparatus, and the spectrum coordinator can acquire the information from the geographical location database.

Preferably, in order to more finely determine the frequency spectrum resources available to the target secondary system apparatus (that is, the indication information on the transmission waveform for the target secondary system apparatus), in addition to the information such as the geographical location or the like, the apparatus information from the target secondary system apparatus may further include a parameter related to the transmission waveform supported by the target secondary system apparatus, such as a waveform type (for example, OFDM, FBMC, CDMA or the like), a maximum transmission power or the like supported by the target secondary system apparatus.

Furthermore, in S13, the available resource acquiring unit 204 can acquire the indication information related to a transmission waveform used for the target secondary system apparatus based on the parameter related to the transmission waveform supported by the target secondary system apparatus included in the apparatus information.

In addition, preferably, in order to more reliably avoid or reduce radio frequency interference on the primary user or other high priority secondary system apparatus caused by spectral regrowth due to the nonlinear characteristics of the target secondary system apparatus, the nonlinear characteristics of the target secondary system apparatus should be taken into account to more finely allocate the frequency spectrum resources to the target secondary system apparatus. Especially in a case that a type of the waveform used for the target secondary system apparatus belongs to the multi-carrier type, since a part of an intermodulation product caused by the nonlinear characteristics (for example, a third-order intermodulation product (IMP3) for a multi-carrier signal with discontinuous frequency spectrums) may fall within a pass-band of a receiver of the primary system, an influence of the nonlinear characteristics is more prominent.

In view of this, preferably, the apparatus information may further include a parameter related to the nonlinear characteristics of the target secondary system apparatus, such as a third-order intermodulation intercept point input power (IIP3), 1 dB compression point input power ($P_{1dB}$) or the like. The available resource acquiring unit 204 can further acquire the indication information related to the transmission waveform used for the target secondary system apparatus based on the parameter related to the nonlinear characteristics of the target secondary system apparatus. For example, in a case that the third-order intermodulation product exceeds an interference threshold of the primary system, the available resource acquiring unit 204 can correspondingly change a subcarrier to be used for the target secondary system apparatus or reduce the transmission power of the subcarrier, so as to protect the application of the primary system.

It should be understood that although the apparatus information from the target secondary system apparatus includes the parameter related to the transmission waveform supported by the target secondary system apparatus and the parameter related to the nonlinear characteristics of the target secondary system apparatus in the above example, the apparatus information may further include but is not limited to parameters such as an operating frequency range, processor capability, remaining electric quantity and the like of the target secondary system apparatus, and the available resource acquiring unit 204 of the resource management device 200 may determine a transmission waveform suitable for the target secondary system apparatus in conjunction with multiple factors, to realize more flexible and efficient frequency spectrum resource allocation.

Then, in S14, the notifying unit 206 of the resource management device 200 notifies the target secondary system apparatus of the determined available resource parameter and the indication information related to the transmission waveform used for the target secondary system apparatus.

Second Example

As another preferred embodiment, the receiving unit 202 may further receive sensing information for a radio environment of the communication system from the target secondary system apparatus, and the sensing information may include for example information on interference around the target secondary system apparatus and the like. Preferably, in a case that the type of transmission waveform supported by the target secondary system apparatus belongs to the multi-carrier type, the sensing information may include information related to interference in a frequency corresponding to each subcarrier. It should be understood that the sensing information is not necessarily sensed by the target secondary system apparatus directly, but may be sensed by for example a slave device of the target secondary system apparatus and be reported to the target secondary system apparatus, and then be transmitted to the resource management device by the target secondary system apparatus.

Figure 3B:
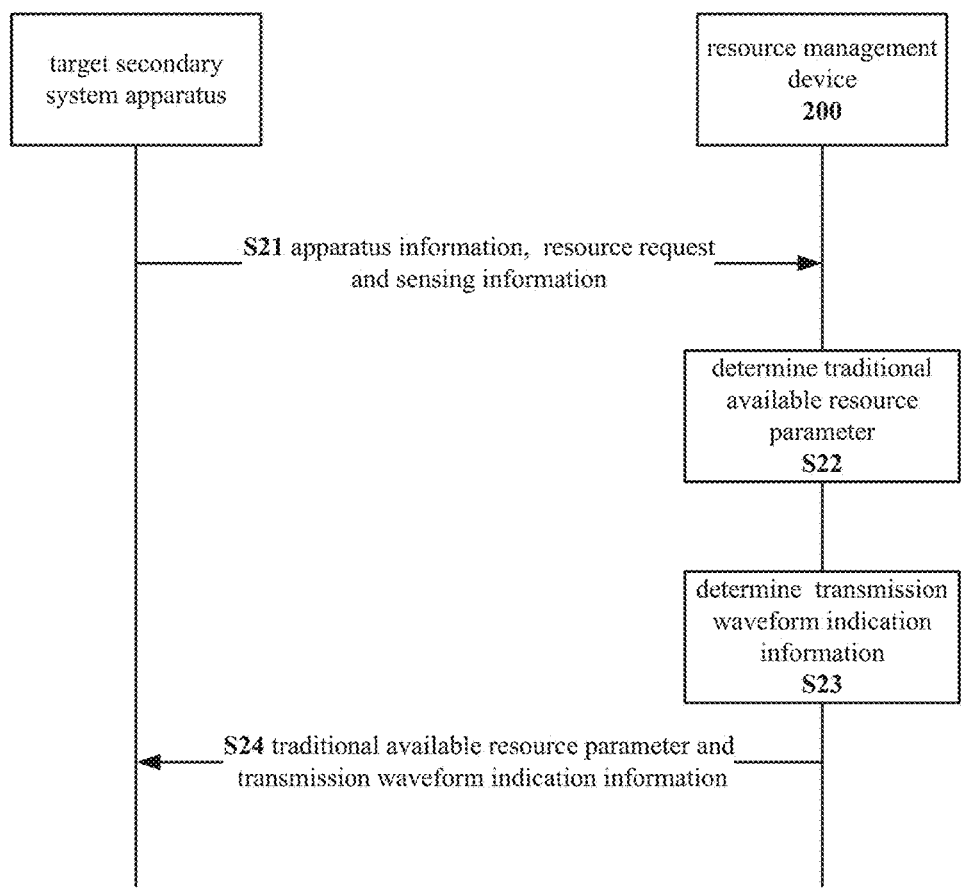
FIG. 3B is a schematic diagram showing a second example of an information interaction process between a resource management device and a target secondary system apparatus according to an embodiment of the present disclosure.

FIG. 3B is a schematic diagram showing a second example of an information interaction process between the resource management device and the target secondary system apparatus according to the embodiment of the present disclosure.

As shown in FIG. 3B, in S21, the target secondary system apparatus transmits the apparatus information, the resource request and the sensing information for the radio environment to the resource management device 200.

Then, in S22, the available resource acquiring unit 204 of the resource management device 200 may determine, in response to the resource request, traditional available resource parameters such as a frequency band, a maximum transmission power available to the target secondary system apparatus or the like based on the geographical location included in the apparatus information and information such as the interference in the sensing information in a traditional manner.

Next, in S23, the available resource acquiring unit 204 may further determine the indication information related to the transmission waveform for the target secondary system apparatus based on the parameter related to the transmission waveform supported by the target secondary system apparatus or the like included in the apparatus information.

In S24, the notifying unit 206 of the resource management device 200 may notify the target secondary system apparatus of the determined available resource parameter and the indication information related to the transmission waveform.

Third Example

In a preferred embodiment, the sensing information may include information related to an occupation condition of sensed target frequency spectrum resources. That is, the target secondary system apparatus senses an available frequency band determined by the resource management device, to determine whether the target secondary system apparatus will be interfered when operating in the available frequency band. FIG. 3C shows an information interaction example between the resource management device and the target secondary system apparatus according to the embodiment of the present disclosure. FIG. 3C is a schematic diagram showing a third example of an information interaction process between the resource management device and the target secondary system apparatus according to the embodiment of the present disclosure.

Figure 3C:
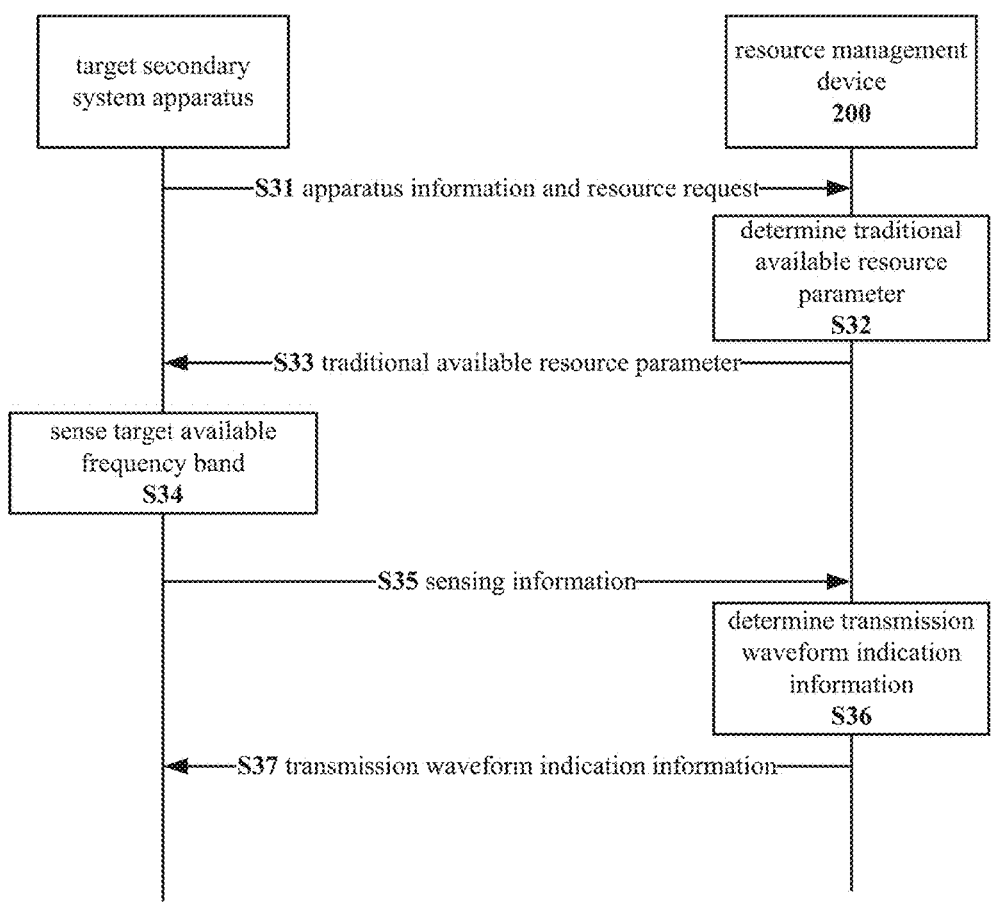
FIG. 3C is a schematic diagram showing a third example of an information interaction process between a resource management device and a target secondary system apparatus according to an embodiment of the present disclosure.

As shown in FIG. 3C, in S31, the target secondary system apparatus transmits the apparatus information and the resource request to the resource management device 200.

Then, in S32, the available resource acquiring unit 204 of the resource management device 200 may determine, in response to the resource request, traditional available resource parameters such as a frequency band, a maximum transmission power and the like available to the target secondary system apparatus based on information such as a geographical location or the like in a traditional manner.

In S33, the notifying unit 206 of the resource management device 200 notifies the target secondary system apparatus of the traditional available resource parameters.

Next, in S34, the target secondary system apparatus senses the available frequency band based on the received traditional available resource parameters, to determine whether the target secondary system apparatus will be interfered when operating in the available frequency band.

Then, in S35, the target secondary system apparatus reports the sensing information including a sensing result for an estimated available frequency band, that is, information related to the occupation condition of the sensed target frequency spectrum resources, to the resource management device.

In S36, the available resource acquiring unit 204 determines the indication information related to the transmission waveform used for the target secondary system apparatus further based on the sensing information and the parameter related to the transmission waveform supported by the target secondary system apparatus included in the apparatus information.

In S37, the notifying unit 206 notifies the target secondary system apparatus of the indication information related to the transmission waveform.

As can be seen, in the example, the resource management device may firstly determine the estimated available frequency spectrum resources of the target secondary system apparatus based on the geographical location information according to the conventional technology, and further finely determine the information related to the transmission waveform available to the target secondary system apparatus in conjunction with information such as a sensing result regarding whether the target secondary system apparatus will be interfered when operating in the estimated available frequency spectrum resources, the transmission waveform supported by the target secondary system apparatus and the like, thereby sufficiently ensuring communication performance of the target secondary system apparatus.

In addition, preferably, information related to a type of the communication apparatus occupying the sensed target frequency spectrum resources should be taken into account when finely determining the transmission waveform available to the target secondary system apparatus. That is, the sensing information described above may further include information related to the type of the communication apparatus occupying the sensed target frequency spectrum resources. For example, in a case that the type of the communication apparatus occupying the sensed target frequency spectrum resources belongs to the primary user in the primary system or other high priority secondary system apparatus, it is preferentially ensured that applications of the communication apparatus will not suffer from harmful interference, therefore, resources for the target secondary system apparatus should be adjusted correspondingly. On the other hand, in a case that the type of the communication apparatus occupying the sensed target frequency spectrum resources belongs to the low priority secondary system apparatus having a lower priority than the target secondary system apparatus, an application of the target secondary system apparatus having a higher priority should be ensured preferentially, therefore, the target secondary system apparatus can operate in the sensed target frequency spectrum resources preferentially.

It should be understood that when determining the resource information available to the target secondary system apparatus, in addition to the factors described above, the resource management device according to the embodiment of the present disclosure may also take factors such as a service requirement, a Quality of Service (QoS) requirement of the target secondary system apparatus and the like into account, so as to improve a utilization ratio of the radio frequency spectrum resources to the greatest extent and satisfy a communication performance requirement of the target secondary system apparatus, while ensuring the communication performance of the primary user and/or the high priority secondary system apparatus.

In addition, it should be understood that although the information interaction between the resource management apparatus and the target secondary system apparatus has been described above as an example, this is only exemplary but not limitation, and an order in the information interaction process described above is not intended to limit the present disclosure. For example, step S12 and step S13 in FIG. 3A and step S22 and step S23 in FIG. 3B can be executed simultaneously.

As described above, according to the embodiment of the present disclosure, the resource management device determines the transmission waveform suitable for the target secondary system apparatus (for example, a type of the transmission waveform, the number of subcarrier frequency bands, a subcarrier sequence number, transmission power of the subcarrier, a parameter related to a filter to be adopted or the like) by taking into account multiple factors, including but not limited to apparatus information (for example, the geographical location, a supportable transmission waveform (including a type of the transmission waveform, a maximum transmission power, an operating frequency range or the like), the nonlinear characteristics and capability (such as processor capability, remaining electric quantity or the like)), a frequency spectrum sensing result for the radio environment (for example, interference information, the occupation condition of the sensed target frequency spectrum resources, the type of the apparatus occupying the sensed target frequency spectrum resources or the like), service requirements, QoS requirements or the like of the target secondary system apparatus, thereby realizing finer allocation for the frequency spectrum resources, improving the utilization efficiency of the frequency spectrum resources, while satisfying a communication performance requirement of each system.

Figure 4:
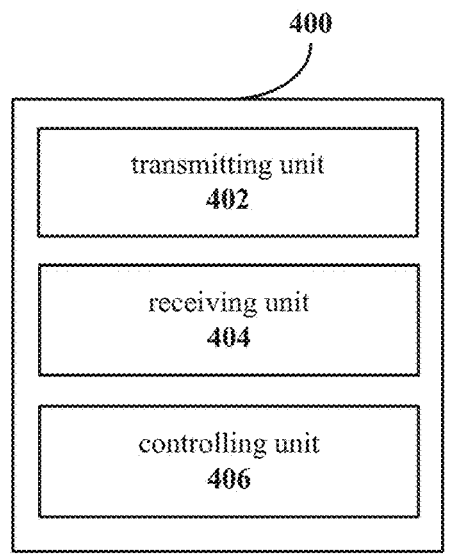
FIG. 4 is a block diagram showing a functional configuration example of a device on a side of a target secondary system apparatus in a secondary system according to an embodiment of the present disclosure.

A functional configuration example of a device on a side of a target secondary system apparatus in a secondary system according to an embodiment of the present disclosure is described next with reference to FIG. 4. FIG. 4 is a block diagram showing a functional configuration example of a device on the side of the target secondary system apparatus in the secondary system according to an embodiment of the present disclosure.

As shown in FIG. 4, a device 400 according to the embodiment may include a transmitting unit 402, a receiving unit 404 and a controlling unit 406. Functional configuration examples of the units are described in detail below respectively.

The transmitting unit 402 may be configured to transmit apparatus information and a resource request of the target secondary system apparatus to a resource management device configured to manage opportunistic utilization for frequency spectrum resources of a primary system by a secondary system in a communication system.

As described above, for example, the apparatus information may preferably include a parameter related to a transmission waveform supported by the target secondary system apparatus, a parameter related to nonlinear characteristics of the target secondary system apparatus or the like, thus the resource management device can more finely determine the resource information available to the target secondary system apparatus further based on the apparatus information.

The receiving unit 404 may be configured to receive the resource information available to the target secondary system apparatus, the resource information being acquired by the resource management device based on the apparatus information of the target secondary system apparatus in response to the resource request. The resource information may include indication information related to the transmission waveform used for the target secondary system apparatus.

As a preferred example, the indication information related to the transmission waveform used for the target secondary system apparatus may include a type of the transmission waveform. In a case that the type of the transmission waveform belongs to the multi-carrier type including OFDM, FBMC and so on, the indication information may further include at least one of the number of subcarrier frequency bands, a subcarrier sequence number and transmission power of the subcarrier. In addition, preferably, the indication information related to the transmission waveform used for the target secondary system apparatus may further include a parameter related to a filter to be adopted such as a type of a window function, an order number, a sampling rate or the like.

The controlling unit 406 is configured to control, based on the received resource information from the resource management device, the target secondary system apparatus to operate.

It should be noted that, in an actual implementation example, the device 400 may further include a selector configured to select an OFDM-based baseband processing circuit or an FBMC-based baseband processing circuit in response to a control signal from the controlling unit 406, and configure a frequency converter, a power amplifier, a filter, a sampler or the like based on the received resource information, so that the target secondary system apparatus operates based on the received resource information. In addition, it should be understood that the OFDM-based baseband processing circuit or the FBMC-based baseband processing circuit can be implemented in one chipset or multiple chipsets.

Figure 5:
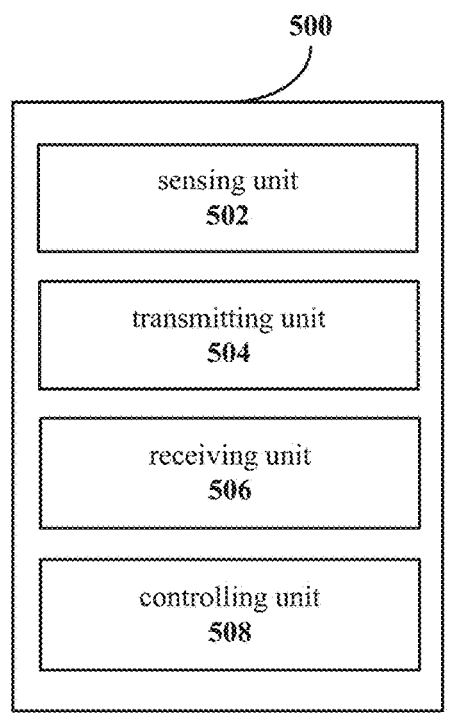
FIG. 5 is a block diagram showing another functional configuration example of a device on a side of a target secondary system apparatus in a secondary system according to an embodiment of the present disclosure.

FIG. 5 is a block diagram showing another functional configuration example of a device on a side of a target secondary system apparatus in a secondary system according to an embodiment of the present disclosure.

As shown in FIG. 5, a device 500 according to the embodiment may include a sensing unit 502, a transmitting unit 504, a receiving unit 506 and a controlling unit 508. Specifically, functional configurations of the transmitting unit 504, the receiving unit 506 and the controlling unit 508 are the same as those of the transmitting unit 402, the receiving unit 404 and the controlling unit 406 described above, which are not described repeatedly here. Only a functional configuration example of the sensing unit 502 is described in detail here.

The sensing unit 502 may be configured to sense a radio environment of the communication system to acquire sensing information. It should be understood that the sensing unit 502 may be located in the target secondary system apparatus, so that the target secondary system apparatus directly senses the radio environment. Alternatively, the sensing unit 502 may be located in a slave device of the target secondary system apparatus, so that the slave device can sense the radio environment and report the sensing result to the target secondary system apparatus. For example, the primary user is a television, the target secondary system apparatus is a home base station, and the slave device may be an intelligent terminal (for example, a mobile phone, a tablet computer or the like) which utilizes a television frequency band. The home base station distributes the work to the intelligent terminals, so that each intelligent terminal senses one target frequency band and reports the sensing result to the home base station.

For example, the sensing information may include for example the information on interference around the target secondary system apparatus, and in a case that the type of the transmission waveform supported by the target secondary system apparatus belongs to the multi-carrier type, the sensing information may include information on interference in a frequency corresponding to each of subcarriers. In addition, preferably, the sensing information may further include information related to an occupation condition of the sensed target frequency spectrum resources, information related to the type of the communication apparatus occupying the sensed target frequency spectrum resources or the like.

The transmitting unit 504 may further transmit the sensing information acquired by the sensing unit 502 to the resource management device, so that the resource management device can determine the resource information available to the target secondary system apparatus by comprehensively taking into account the apparatus information and the sensing information from the target secondary system apparatus and the like.

It should be understood that the functional configuration example of the device on the side of the target secondary system apparatus described here corresponds to the resource management device described above, thus contents not described in detail here may be referred to the foregoing description at corresponding positions, which are not described repeatedly here anymore.

In addition, according to the embodiments of the present disclosure, the target secondary system apparatus as the cognitive radio apparatus acquires from the resource management device the frequency spectrum resources available to applications thereof through information interaction, without executing complex calculation, thus configuration of the target secondary system apparatus can be simplified, and the cost and power consumption can be reduced.

In addition, it should be understood that although the functional configuration examples of the resource management device and the device on the side of the target secondary system apparatus according to the embodiments of the present disclosure are described here with reference to the drawings, these are only exemplary but not limitations. Those skilled in the art may appropriately modify the above functional configurations, for example, add, delete, combine the functional modules in the embodiments or the like, and all of these modifications fall within the scope of the present disclosure.

Corresponding to the devices according to the embodiments of the present disclosure, a resource management method and a method executed on a side of a target secondary system apparatus are further provided according to the present disclosure. Process examples of a resource management method in a communication system and a method executed on a side of a target secondary system apparatus in a secondary system according to the embodiments of the present disclosure are described below with reference to FIG. 6 and FIG. 7.

Figure 6:
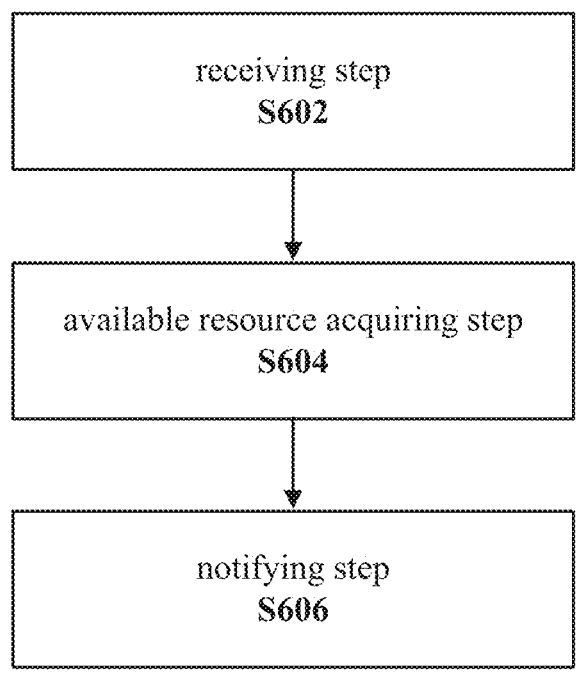
FIG. 6 is a flow chart showing a process example of a resource management method in a communication system according to an embodiment of the present disclosure.

First, a process example of a resource management method in a communication system according to the embodiment of the present disclosure is described with reference to FIG. 6. FIG. 6 is a flow chart showing the process example of the resource management method in the communication system according to the embodiment of the present disclosure. The resource management method is used for managing opportunistic utilization for frequency spectrum resources of a primary system by the secondary system in the communication system.

As shown in FIG. 6, in a receiving step S602, apparatus information and a resource request of a target secondary system apparatus among one or more secondary system apparatuses in a secondary system are received. The apparatus information here may include for example a geographical location of the target secondary system apparatus, and may preferably include for example a parameter related to a transmission waveform supported by the target secondary system apparatus, a parameter related to nonlinear characteristics of the target secondary system apparatus or the like.

Next, in an available resource acquiring step S604, resource information available to the target secondary system apparatus is acquired based on the apparatus information of the target secondary system apparatus in response to the resource request, the resource information including indication information related to a transmission waveform used for the target secondary system apparatus. The indication information may preferably include a type of the transmission waveform. In a case that the type of the transmission waveform belongs to the multi-carrier for example OFDM or FBMC, the indication information may further include at least one of the number of subcarrier frequency bands, a subcarrier sequence number and transmission power of the subcarrier. In addition, preferably, the indication information may further include a parameter related to a filer to be adopted.

Then, in a notifying step S606, the target secondary system apparatus is notified of the acquired resource information.

Figure 7:
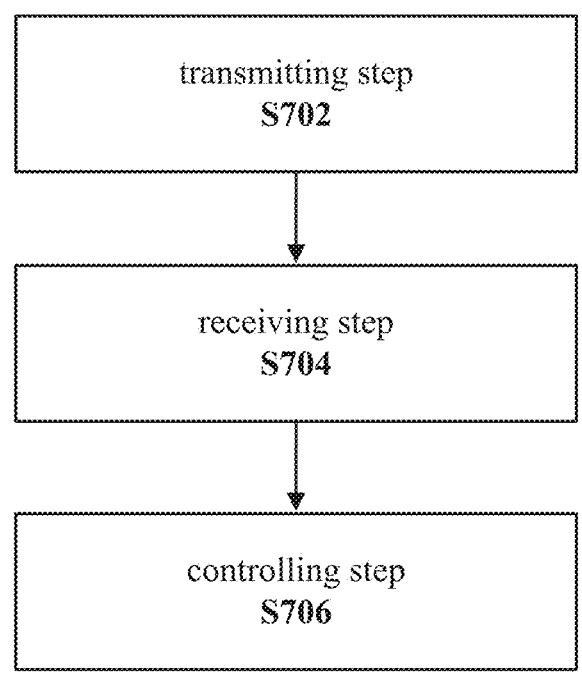
FIG. 7 is a flow diagram showing a process example of a method performed on a side of a target secondary system apparatus in a secondary system according to an embodiment of the present disclosure.

A process example of a method on a side of a target secondary system apparatus in the secondary system according to the embodiment of the present disclosure is described below with reference to FIG. 7. FIG. 7 is a flow chart showing a process example of a method on a side of a target secondary system apparatus in the secondary system according to the embodiment of the present disclosure.

As shown in FIG. 7, in a transmitting step S702, apparatus information and a resource request of the target secondary system apparatus are transmitted to a resource management device, the resource management device being configured to manage opportunistic utilization for frequency spectrum resources of a primary system by a secondary system in a communication system.

Next, in a receiving step S704, resource information available to the target secondary system apparatus, acquired by the resource management device based on the apparatus information of the target secondary system apparatus in response to the resource request, is received. The resource information includes indication information related to a transmission waveform used for the target secondary system apparatus.

Then, in a controlling step S706, the target secondary system apparatus is controlled to operate based on the received resource information.

It should be noted that although the process examples of the methods according to the embodiments of the present disclosure are described above, the process examples are only exemplary but not limitation. Those skilled in the art may modify the above embodiments based on the principle of the present disclosure, for example, add, delete, combine the steps in the above embodiments or the like, and all of these modifications fall within the scope of the present disclosure.

In addition, it should be noted that the method embodiments here correspond to the device embodiments described above, thus contents which are not described in detail in the method embodiments may be referred to the foregoing description at corresponding positions in the device embodiments, which are not described repeatedly here anymore.

In addition, an electronic apparatus is further disclosed in the embodiments of the present disclosure. The electronic apparatus may include one or more processors configured to perform a function of each unit in the device embodiments described above.

It should be understood that machine-executable instructions in a storage medium and a program product according to the embodiments of the present disclosure may be also configured to execute the methods corresponding to the device embodiments described above, thus contents which are not described in detail may be referred to foregoing description at corresponding positions, which are not described repeatedly here anymore.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 800 illustrated in FIG. 8, which can perform various functions when various programs are installed thereon.

Figure 8:
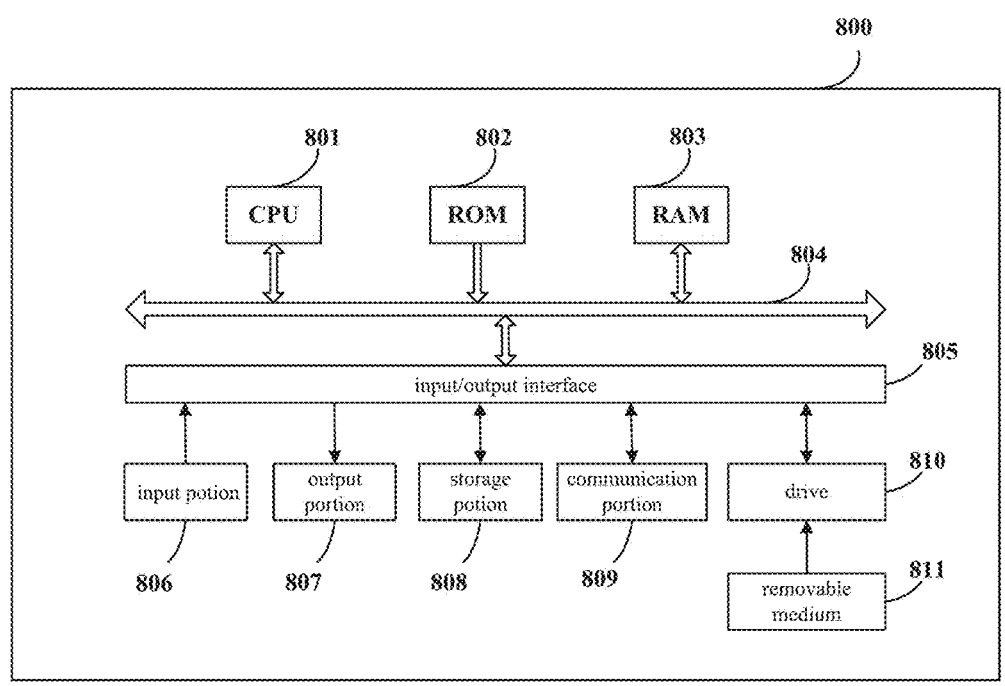
FIG. 8 is a block diagram showing an exemplary structure of a personal computer as an information processing apparatus adopted in an embodiment of the present disclosure.

In FIG. 8, a Central Processing Unit (CPU) 801 performs various processes according to a program stored in a Read Only Memory (ROM) 802 or loaded from a storage portion 808 into a Random Access Memory (RAM) 803 in which data required when the CPU 801 performs the various processes is also stored as needed.

The CPU 801, the ROM 802 and the RAM 803 are connected to each other via a bus 804 to which an input/output interface 805 is also connected.

The following components are connected to the input/output interface 805: an input portion 806 including a keyboard, a mouse, etc.; an output portion 807 including a display, e.g., a Cathode Ray Tube (CRT), a Liquid Crystal Display (LCD), etc., a speaker, etc.; a storage portion 808 including a hard disk, etc.; and a communication portion 809 including a network interface card, e.g., an LAN card, a modem, etc. The communication portion 809 performs a communication process over a network, e.g., the Internet.

A drive 810 is also connected to the input/output interface 805 as needed. A removable medium 811, e.g., a magnetic disk, an optical disk, an magneto optical disk, a semiconductor memory, etc., can be installed on the drive 810 as needed so that a computer program fetched therefrom can be installed into the storage portion 808 as needed.

In the case that the foregoing series of processes are performed in software, a program constituting the software is installed from a network, e.g., the Internet, etc., or a storage medium, e.g., the removable medium 811, etc.

Those skilled in the art shall appreciate that such a storage medium will not be limited to the removable medium 811 illustrated in FIG. 8 in which the program is stored and which is distributed separately from the apparatus to provide a user with the program. Examples of the removable medium 811 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 802, a hard disk included in the storage portion 808, etc., in which the program is stored and which is distributed together with the apparatus including the same to the user.

An application example of the present disclosure is given below by taking a secondary user as the cognitive radio apparatus.

First Application Example

Figure 9A:
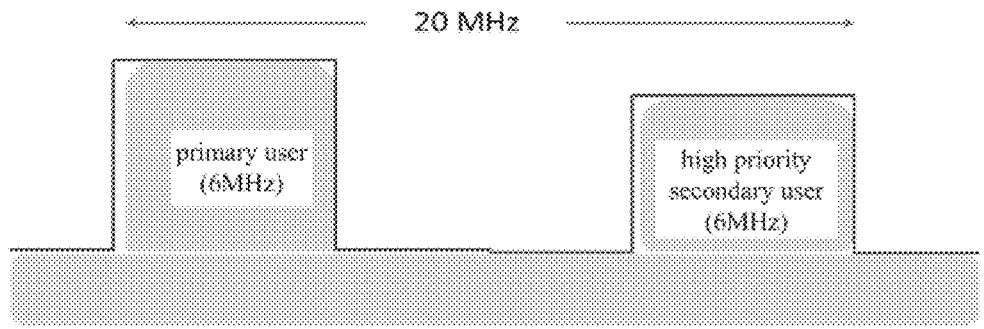
FIG. 9A and FIG. 9B are illustration diagrams showing a first application example according to an embodiment of the present disclosure.
Figure 9B:
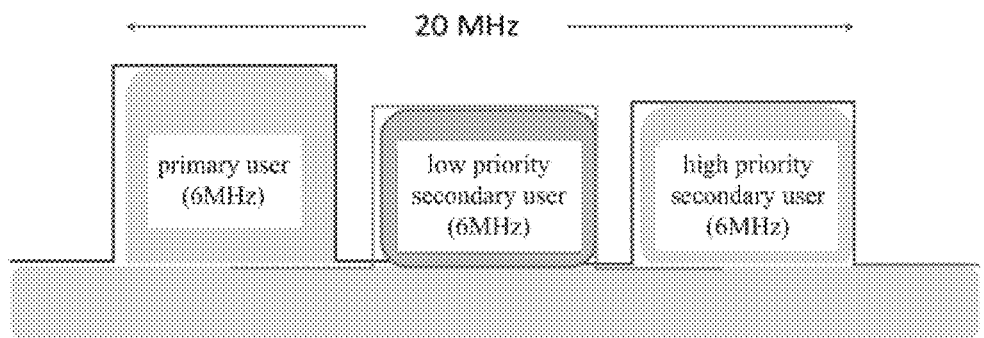

A first application example according to the embodiment of the present disclosure is described below with reference to FIG. 9A and FIG. 9B.

In order to realize efficient utilization for frequency spectrum in a TV white space in the broadcast and television frequency band, according to the embodiments described above, firstly, a target secondary user as the cognitive radio apparatus performs frequency spectrum sensing for an environment where the target secondary user is located. For example, the cognitive radio apparatus in the example is a WiFi apparatus which generally utilizes a bandwidth of 20 MHz, and senses a frequency spectrum of 20 MHz according to a bandwidth requirement thereof, as shown in FIG. 9A. The cognitive radio apparatus detects that there is only an idle frequency spectrum of 8 MHz, and reports the sensing result to the spectrum management device in the present disclosure. In order to realize transmission of 802.11a WiFi signal contents of 20 MHz in the idle television frequency spectrum of 8 MHz, the spectrum management device determines to perform spectrum compression (compressed to be within a bandwidth of 8 MHz) by using multi-rate signal processing.

A basic process of the spectrum compression is to firstly perform cubic interpolation on sampling points of the baseband digital signal, then perform low-pass filtering (implemented by a FIR digital filter), and finally acquire compressed frequency spectrum meeting the requirement. The spectrum management device according to the present disclosure selects filter parameters (for example, a type, an order number or the like of the filter) for the cognitive radio apparatus and provides spectrum compression indication, so that the cognitive radio apparatus can realize the spectrum compression by simple calculation. The specific spectrum compression process is the same as that in the conventional technology, which is not described in detail in the present disclosure. FIG. 9B is a schematic diagram showing transfer of the compressed WiFi signal in the idle television spectrum of 8 MHz.

With the resource management method according to the present disclosure, the following advantageous effects can be realized for example: (1) for the limited available frequency spectrum bandwidth, frequency spectrum of a transmission signal of the cognitive radio apparatus is compressed, thereby significantly improving a utilization ratio of the frequency spectrum, and different transmission frequency spectrum bandwidths can be supported without changing hardware of the cognitive radio apparatus. In the example, the radio frequency bandwidth of the cognitive radio apparatus is compressed from 20 MHz to be within 8 MHz, enabling transfer of a broadband signal in a narrower television channel; and (2) by dynamically selecting an appropriate filter type and appropriate filter parameters (for example, an order number and corresponding parameters of the filter) according to a specific scenario and a regulation requirement (for example, a frequency spectrum policy), adjacent channel leakage of the transmission signal can be suppressed effectively, thereby avoiding generating harmful interference on a primary user (or other high priority secondary user) operating in an adjacent channel.

Second Application Example

A second application example according to the present disclosure is described below with reference to FIG. 10A to FIG. 12. In the second application example, frequency spectrum sharing for continuous or discontinuous frequency spectrum based on multi-carrier technology is described by taking FBMC as an example. It should be understood that the example is also applicable to other multi-carrier technology such as OFDM or the like.

Figure 10A:
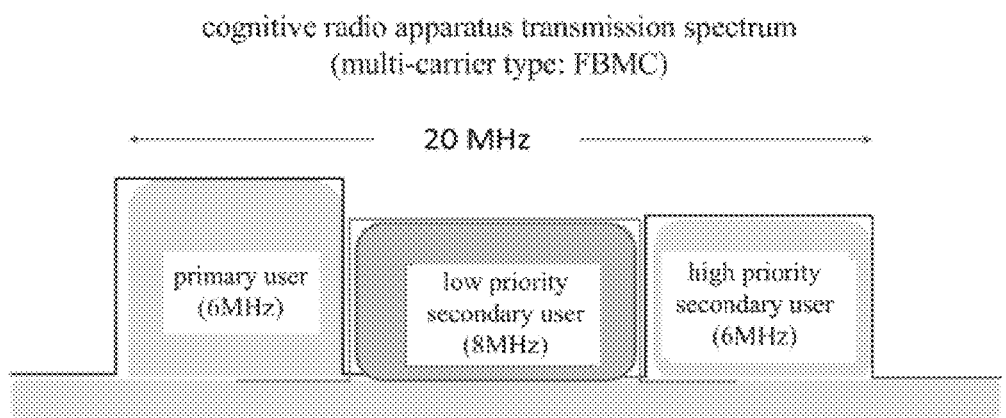
FIG. 10A and FIG. 10B are illustration diagrams showing a second application example according to an embodiment of the present disclosure.
Figure 10B:
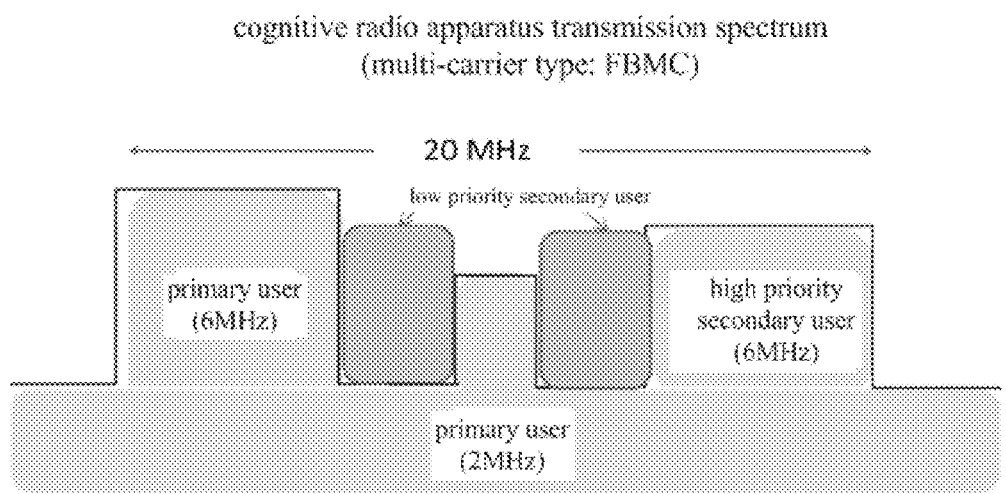

As described above, the FBMC-based spectrum sharing has lower out-of-band emission as compared with the other multi-carrier technology such as OFDM, therefore, an FBMC multi-carrier signal has a lower adjacent channel leakage (at least 30 dB lower than the adjacent channel leakage of a OFDM multi-carrier signal), thus has higher spectrum utilization ratio and spectrum access flexibility, and also supports discontinuous spectrum access, while satisfying a strict interference suppression requirement. FIG. 10A and FIG. 10B are schematic diagrams respectively showing FBMC-based continuous spectrum access and spectrum sharing and FBMC-based discontinuous spectrum access and spectrum sharing. As can be seen, idle frequency spectrum resources (including continuous idle frequency spectrum resources and discontinuous idle frequency spectrum resources) can be used more flexibly according to the present technology, thus the frequency spectrum utilization ratio can be improved greatly in the technology compared with the conventional technology.

Figure 11:
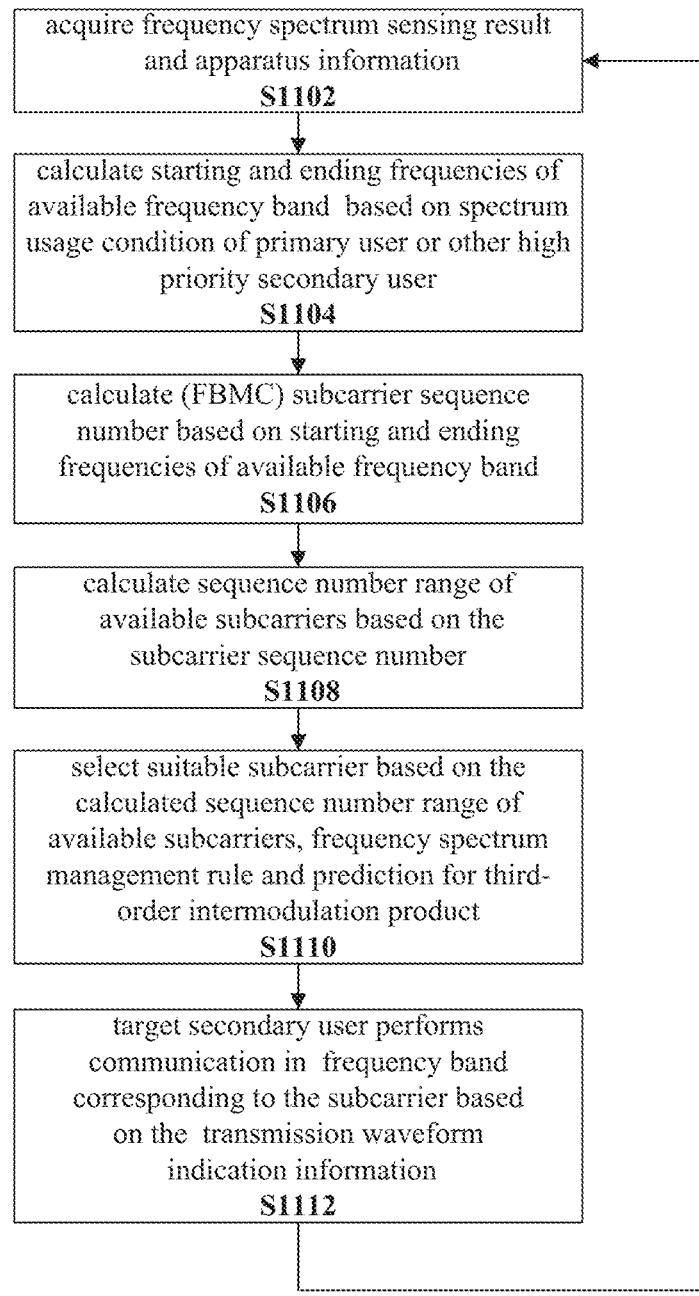
FIG. 11 is a flow chart showing a process example of a FBMC-based spectrum management algorithm according to the second application example of the present disclosure.

A process example of a FBMC-based spectrum management algorithm according to the second application example of the present disclosure is described below with reference to FIG. 11. FIG. 11 is a flow chart showing a process example of the FBMC-based spectrum management algorithm according to the second application example of the present disclosure.

As described in FIG. 11, in step S1102, the resource management device according to the embodiment of the present disclosure acquires a frequency spectrum sensing result and apparatus information (for example, the apparatus condition such as a parameter IIP3 reflecting the nonlinear characteristics of the cognitive radio apparatus or the like), a service type, QoS, a power consumption requirement and the like of the target secondary user as the cognitive radio apparatus.

Then, in step S1104, the resource management device calculates a starting frequency and an ending frequency of an available frequency band (that is, a subcarrier) based on frequency bands currently occupied by the primary user and other users (for example, high priority secondary users), interference suppression requirements of the these users and the apparatus information (such as a maximum transmission power, a third-order input intermodulation power and the like) of the target secondary user.

Next, in step S1106, the resource management device calculates a subcarrier sequence number based on the calculated starting frequency and ending frequency of the available frequency band (the subcarrier).

In step S1108, the resource management device acquires a sequence number range of the available subcarriers based on the calculated subcarrier sequence number.

Then, in step S1110, the resource management device selects a suitable subcarrier for spectrum sharing based on the acquired sequence number range of the available subcarriers and in combination with a frequency spectrum management rule in an environment where the target secondary user is located and prediction for the third-order intermodulation product.

Next, in step S1112, the target secondary user performs communication in a frequency band corresponding to the selected subcarrier, and returns to step S1102 before a next transmission period so as to appropriately readjust a transmission waveform of the target secondary user as necessary.

It can be seen that, in the example, when selecting the subcarrier sequence number and the transmission power suitable for the target secondary user, the resource management device should take the following factors into account:

(1) A frequency spectrum sensing result for a radio environment where the target secondary user is located, for example, a type and a frequency spectrum usage condition of the primary user or the high priority secondary user. A frequency band for which the primary system is required to be protected can be calculated by using a protection requirement for the primary system. For the determined frequency band available to the target secondary user, an interference signal from the primary user (or the high priority secondary user) can be found/analyzed by sensing, and a suitable operating parameter (for example, a transmission frequency spectrum parameter suitable for the target secondary user or the like) is selected and is adjusted if necessary by performing analysis and calculation based on the sensing (feedback) information of the target secondary user; thereby effectively ensuring or improving the communication performance of the secondary system.

(2) An interference suppression requirement (set by a spectrum management authority of a region where the target secondary user is located) which the target secondary user should obey, that is, a regulation related to radio frequency spectrum management.

(3) A service type and a QoS requirement of the target secondary user.

(4) Apparatus information and an actual performance (particularly prediction for the third-order intermodulation product) of the target secondary user, such as a maximum transmission power, a third-order input intermodulation power, a range of operating frequencies, processor capability, remaining electric quantity an the like of the cognitive radio apparatus.

It should be understood that the above factors taken into account are only exemplary but not limitation. When actually determine the frequency spectrum resources available to the target secondary user, a part of the factors or other factors than these factors are taken into account.

Figure 12:
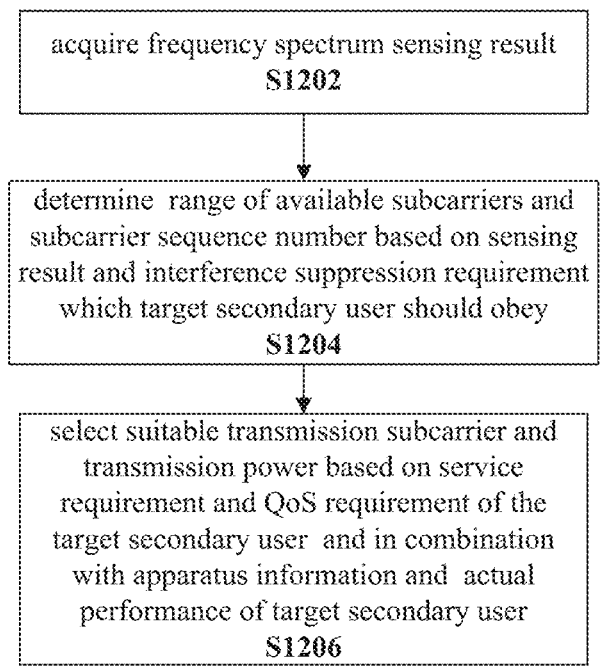
FIG. 12 is a flow chart showing a process example of selecting a subcarrier suitable for a target secondary user according to the second application example of the present disclosure.

In combination with the above factors taken into account, as an example, how to select a subcarrier available to the target secondary user is described with reference to FIG. 12. FIG. 12 is a flow chart showing a process example of selecting a subcarrier suitable for the target secondary user according to the embodiment of the present disclosure.

As shown in FIG. 12, in step S1202, the resource management device acquires a frequency spectrum sensing result for a radio environment where the target secondary user is located, the frequency spectrum sensing result including a frequency spectrum sensing result for a primary user or other secondary user in a candidate frequency band.

Next, in step S1204, a range of available subcarriers and subcarrier sequence numbers are determined based on the sensing result and an interference suppression requirement (that is, a regulation related to radio frequency spectrum management) which the target secondary user should obey (set by a spectrum management authority of a region where the target secondary user is located).

Then, in step S1205, a suitable transmission subcarrier and transmission power are further selected based on the service requirement and the QoS requirement of the target secondary user and in combination with apparatus information and the actual performance of the target secondary user.

In addition, a third-order intermodulation product generated by the selected subcarrier is also required to be predicted in a case that an influence of the nonlinear characteristics of the target secondary user is taken into account. If the third-order intermodulation product exceeds an interference threshold, it is required to alternatively use other subcarriers or reduce the transmission power of the subcarrier.

It should understand that although two application examples of the present disclosure are specifically described above, the two application examples are only exemplary but not limitation. Those skilled in the art can apply the present technology to any other scenario requiring flexible and efficient spectrum sharing according to the principle of the present disclosure and make corresponding adjustment for the embodiments described above according to a specific application scenario, all of these modifications are of course considered to fall within the scope of the present disclosure.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated apparatuses. Alternatively, multiple functions implemented by multiple units in the above embodiments may be implemented by separated apparatuses respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

The invention claimed is:

1. A resource acquiring system in a communication system, the resource acquiring system comprising:
circuitry configured to,
before using a frequency spectrum of a primary system in a same region, access a database in the same region and submit state information of a secondary system to the database;
receive calculation information of an interference amount of the secondary system on the primary system based on the state information of the secondary system, and receive calculation information of an estimated available frequency spectrum resource for the secondary system in the current state based on the calculated interference amount of the secondary system on the primary system,
wherein the state information of the secondary system includes location information, a spectrum emission mask, a transmission bandwidth, and a carrier frequency.

2. The resource acquiring system according to claim 1, wherein the database stores coverage information of the primary system, wherein the coverage information includes an allowable interference limit of the primary system, and a frequency spectrum resource usage condition of the primary system.

3. The resource acquiring system according to claim 1, wherein the circuitry is configured to
receive resource information including indication information related to a transmission waveform for a target secondary system apparatus in the secondary system, at least one of subcarrier frequency bands number, a subcarrier sequence number, and a subcarrier transmission power.

4. The resource acquiring system according to claim 3, wherein
the resource information includes at least one of a waveform type and a maximum transmission power.

5. The resource acquiring system according to claim 1, wherein the circuitry is configured to
sense an available frequency band based on available resource parameters, to determine whether the resource acquiring system will experience interference when operating in the available frequency band.

* * * * *